United States Patent [19]

Camerini

[11] Patent Number: 4,597,190

[45] Date of Patent: Jul. 1, 1986

[54] MACHINE FOR THE CONTINUOUS ROASTING OF PRODUCTS SUCH AS COFFEE AND BARLEY, AND METHOD REALIZABLE WITH THE SAID MACHINE

[75] Inventor: Pier Cesare P. Camerini, Casalecchio di Reno, Italy

[73] Assignee: Officine Vittoria S.p.A., Bologna, Italy

[21] Appl. No.: 700,682

[22] Filed: Feb. 12, 1985

[30] Foreign Application Priority Data

Mar. 9, 1984 [IT] Italy ................... 3374 A/84

[51] Int. Cl.⁴ ............................................. F26B 17/10
[52] U.S. Cl. ................................ 34/57 A; 34/147; 34/164; 34/233
[58] Field of Search ............ 34/22, 57 A, 147, 164, 34/233, 34, 231

[56] References Cited

U.S. PATENT DOCUMENTS 3,084,450  4/1963  Hansen .................................. 34/164
3,089,253  5/1963  Evans .................................. 34/57 A
4,237,622  12/1980  Francis .................................. 34/147

FOREIGN PATENT DOCUMENTS 676837  7/1979  U.S.S.R. .............................. 34/147

Primary Examiner—Albert J. Makey
Assistant Examiner—David W. Westphal
Attorney, Agent, or Firm—Darby and Darby

[57] ABSTRACT

Disclosed herein is a machine for the continuous roasting of coffee, comprising transportation means having a product resting surface through which air is able to pass, for transferring the said coffee across closed surroundings into which hot air is injected; in practice, the said transportation means are constituted by a channel, with walls through some of which air can pass, shaped in the form of a cylindrical spiral on a vertical axis and bounded by a cylindrical casing coaxial thereto that is closed at the top and bottom and delimits the said enclosed surroundings; a vibrator causes the said coffee to rise up along the said spiral channel while the said hot air is forced, both by the said walls through which air can pass and by those through which air cannot pass, to follow a spiral path in the course of which the said hot air hits and envelops completely from below the said coffee, thereby performing the operations of roasting and hulling.

3 Claims, 2 Drawing Figures

MACHINE FOR THE CONTINUOUS ROASTING OF PRODUCTS SUCH AS COFFEE AND BARLEY, AND METHOD REALIZABLE WITH THE SAID MACHINE

BACKGROUND OF THE INVENTION

The invention relates to a machine for the continuous roasting of products such as coffee, barley, substitutes, hazel nuts etcetera, and to a roasting method realizable with the said machine.

A process as delicate as it is important, to which products such as barley etcetera, and more particularly coffee, have to be subjected is, as is known, roasting by means of which the beans are dried by exposure to heat until they have taken on a characteristic light brown color. During the said process the coffee is, first of all, suitably and adequately heated, after which it is cooled. The major difficulties arise during the said first phase, that is to say the heating operation, since although the coffee has to be heated to dissipate the humidity contained therein and for the preparation thereof for consumption, the heating must neither be too great nor be applied for too long, otherwise the coffee could, in the first instance, get burnt, and in the second, undergo a decrease in the essential oils and in the aromatic substances which, during this phase, tend to penetrate towards the outside of the beans.

DESCRIPTION OF THE PRIOR ART

The roasting machines in use at the present time fall virtually into two categories: those that operate discontinuously and those that operate continuously.

The machines of the first type are essentially constituted by a cylindrical container to the outside of which flames are directly applied, and inside which a predetermined quantity of coffee to be roasted is inserted at each cycle.

Provided in the inside of the said container are movable blades that maintain the coffee in constant motion in order that it be heated and roasted in the most uniform way possible and that the beans do not remain immobile in contact with the hot walls of the container where they would get burnt. The time required for roasting, which can be improved by blowing hot air into the mass of coffee held in the container, is generally around 10–15 minutes (depending on the degree of roasting).

Upon completion of the roasting operation, the coffee is extracted from the container and is cooled, leaving the container free to be filled with fresh coffee to be roasted.

With the machines of the second type, namely those that operate continuously, it has been possible to increase the productivity and to lessen the prior mentioned danger of the beans getting burnt through direct contact with a hot wall, and this is because the said machines comprise a conveyor belt movable continuously underneath a number of pipes from which air heated to approximatly 600° C. is injected towards the said conveyor which, for obvious reasons of economy, has, therefore, to be in closed surroundings.

In this way, the coffee is hit during the forward movement thereof on the said conveyor, by a hot fluid that roasts it suitably and, at the same time, carries away with it the husks detached from the surface of the beans.

However, in comparison with the machines of the first type there is no substantial variation in the roasting time, nor does the outgoing temperature of the roasted coffee vary, and it is very difficult with the said systems to achieve high degrees of roasting (to suit, for example, the Mediterranean taste).

Furthermore, the said continuous operation machines are very complex, and for them to be a good financial proposition it is necessary that they handle large quantities of coffee; and because of this they are not within the reach of all the firms that would be interested in the improved results achievable therewith.

SUMMARY OF THE INVENTION

The object of the invention is, therefore, to make available a machine for the continuous roasting of products such as coffee and barley etcetera that renders possible a large reduction in the roasting time, and is financially suitable also for the roasting of modest quantities of a product.

Another object of the invention is to make available a machine that fulfils the preceding object and, moreover, is able to roast the product uniformly without the danger of burning it.

A further object of the invention is to make available a machine that fulfils the preceding objects and, moreover, is able to remove rapidly and efficiently the husks detached from the product during the said roasting operation.

Yet another object of the invention is to make available a machine that fulfils the preceding objects, is structurally simple and reliable, operationally dependable and practical, and is of a limited size.

These and other objects too that will become more apparent later on are all attained with the machine according to the invention for the continuous roasting of products such as coffee and barley, comprising transportation means, the surface of which for supporting the product to be roasted can be penetrated by air, able to transfer continuously the said product across closed surroundings into which hot air is injected, and wherein the said transportation means are constituted by a channel shaped in the form of a cylindrical spiral on a vertical axis resting on the bottom of a cylindrical casing that is closed at the top by a hood with a vent and is connected to a vibrating base, the said channel being delimited bilaterally by a pair of cylindrical liners, one external and the other internal, coaxial and housed in the inside of the said casing, the external one of which closed at the top by a cover; the said spiral shaped channel being able to be penetrated by air in at least the transportation surface and the external lateral wall but not in, at least, the internal wall, and being in communication with a chamber formed by the internal cylindrical wall which, in turn, is connected to a source for blowing hot air through an inlet made in the lower wall of the casing, the said channel being, moreover, in communication with a hopper for supplying the product to be roasted through an infeed duct that runs into the base of the spiral formed by the said transportation surface, provision being made for the roasted product to be discharged in the top part of the machine, in the region of the terminal extremity of the said transportation means.

Advantageously with the machine constructed in this way, a roasting method is created whereby the product to be handled is made to move forward, through vibrations, along a spiral path extending from the bottom upwards and, during the said movement, the product to be roasted is hit and enveloped completely from below by a hot fluid that intersects the spiral path thereof and, along the said channel, roasts the product carrying away the husks detached from the product, the movement of the said fluid being slowed down towards the top in such a way that the said product to be roasted be hit at temperatures that decrease gradually from the bottom upwards.

The vibrating effect makes it possible to maintain constantly the movement of the product with respect to the transportation means and, contemporaneously, to modify the arrangement, one with respect to the other, of the beans amassed along the transportation means, and this favors the detaching of the husks and, in general, the roasting process.

BRIEF DESCRIPTION OF THE DRAWING

Other details and advantages of the machine according to the invention will be rendered obvious during the detailed description that follows of one embodiment given purely as an unlimited example, with reference to the accompanying drawing, in which.

DESCRIPTION OF THE PREFERRED EMBODIMENT

Figure 1:
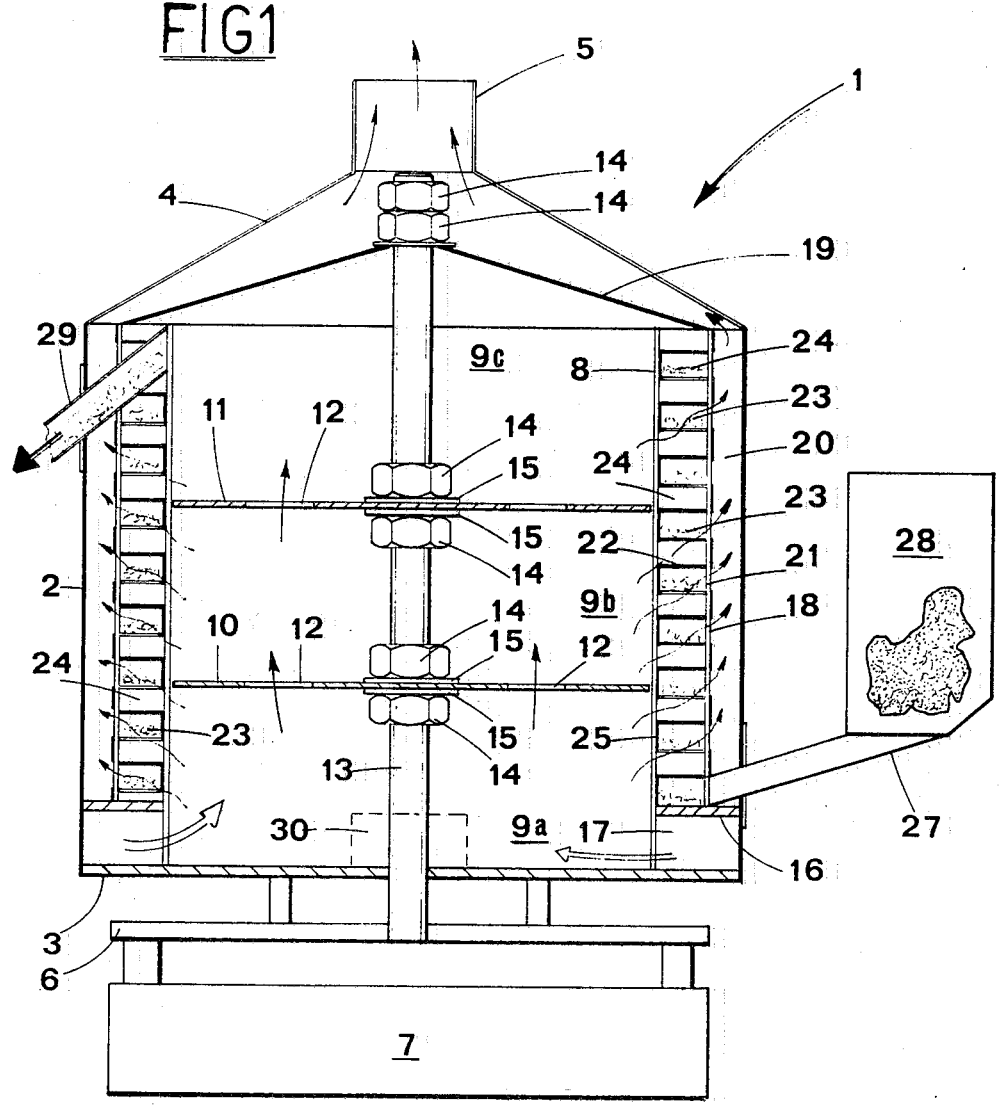
FIG. 1 shows, in sectional form, a vertical axial view of the machine for continuous roasting according to the invention.

With reference to the said figures and, in particular, to FIG. 1 in which the machine for continuous roasting according to the invention is shown globally at 1, it can be seen that the said machine is provided with an external cylindrical casing 2 closed hermetically at the bottom by a disk 3, and at the top, by a hood 4 on which is mounted coaxially a vent 5 for the removal of fumes.

The disk 3 is connected rigidly in a known fashion to the vibrating base 6 of a vibrator 7 of a type known for the reason that will become apparent in the ensuing text. Inside the casing 2, coaxially thereto, is provided a drilled thin sheet metal liner 8 fixed to the disk 3 in such a way that the space delimited by the casing 2 is divided into an external annular chamber and an internal cylindrical chamber which is subdivided, in turn, into a lower area 9a, a central area 9b and a top area 9c, by two diaphragms, namely a lower diaphragm 10 and an upper diaphragm 11, provided with adjustable opening holes 12 in a non-illustrated way and connected adjustably along the axis of the casing 2, to a support and regulation element 13 fixed coaxially to the disk 3.

In the said embodiment, the support and regulation element 13 is constituted, for example, by a threaded shaft along which are screw connected two pairs of nuts 14, each pair of which tightly blocking, with the interposition of a pair of washers 15, one of the said two diaphragms 10 and 11.

The annular chamber closed between the casing 2 and the liner 8 is, in turn, divided by an annular plate 16 into a lower cavity 17 and an upper area having a drilled thin sheet metal liner 18 whose lower part is connected to the annular plate 16 and whose upper part is closed by a cover 19 connected to the support and regulation element 13 through, for example, a washer 15 and a pair of nuts 14, as in the described embodiment.

The outer liner 18 delimits with the casing 2 a chamber shown at 20 in FIG. 1 in which the fumes are collected, and with the inner liner 8 an area in which two superposed spiral strips are provided, shown at 21 and 22, respectively, both of which made, in the case under consideration, of sheet metal, the former drilled and the latter undrilled. The said strips are coaxial and designed to constitute with the said inner liner 8 and the said outer liner 18, two superposed coaxial spirals, the lower one of which, shown at 23, (having as the underneath thereof the drilled sheet metal strip 21) being greater in height than the upper one, shown at 24, (having as the underneath thereof the sheet metal strip 22), for the reason that will become apparent during the description of the operation of the machine according to the invention.

Figure 2:
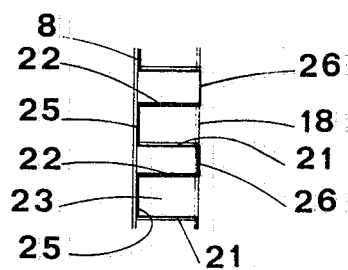
FIG. 2 shows, in sectional form and in an enlarged scale, one constructional detail of the machine in question.

As can be seen in the figures, and more particularly in FIG. 2 in which this characteristic is shown, provided against the inner wall of the lower spiral 23 is a spiral element 25; and provided against the wall of the outer liner 18, turned towards the casing 2, and in the region of the upper spiral 24 is a second spiral element 26. In this way, the lower spiral 23 has the lower and outer side thereof, respectively, towards the casing 2, drilled, and the remainder, namely the upper and inner side thereof towards the axis, solid, while the upper spiral 24 has the lower and outer side thereof, respectively, solid, and the remainder, namely the upper and inner side thereof, drilled.

Furthermore, provision is made for: a channel 27 for infeeding the product to be roasted, the bottom part of this running into the lowest point of the lower spiral 23 and connected, at the top, to the outlet of a hopper 28 for supplying the product to be roasted; an outgoing channel 29 oriented towards the outside, from the highest point of the lower spiral 23, (inside a non-illustrated container or the like) in which the roasted product is collected; and lastly, a manifold, shown diagrammatically with dashes at 30 in FIG. 1, that leads into the cavity 17 and is suitably connected, outside the machine 1, to a non-illustrated generator of hot air.

The operation of the machine for the continuous roasting of products such as coffee and barley described herein takes place as follows:

The product to be roasted is placed in the hopper 28 and from this, dropping along the infeed channel 27, it arrives at the lowest point of the lower spiral 23. Under the effect of the vibrations generated by the vibrator 7 (and by this transmitted to the machine 1), the coffee beans start to rise up along the lower spiral 23 and to be displaced over a spiral path that leads to the highest point of the said lower spiral 23 where the outgoing channel 29 for the roasted coffee is located. During this movement inside the lower spiral 23 the coffee beans are immersed completely in the hot air which, injected into the lower cavity 17 through the manifold 30 by the non-illustrated generator of hot air, crosses the drilled wall of the liner 8 and enters the lower area 9a, and then the areas 9b and 9c of the internal chamber of the machine delimited by the liner 8. The air then passes back through the drilled wall of the liner 8 and goes into the spiral 24 whence, via the drilled sheet metal strip 21, it penetrates into the spiral 23 where the coffee beans to be roasted are located. From here the air exits across the drilled wall of the outer liner 18 towards the chamber 20 in which the fumes are collected and up as far as the area delimited at the bottom by the cover 19 and at the top by the hood 4, from where it is discharged externally through the vent 5.

The product, for example coffee beans, is, in this way, hit a number of times at different decreasing temperatures, from the bottom upwards, by hot air which, besides roasting the coffee uniformly since the said coffee is totally immersed therein, carries away therewith the husks so that the coffee leaving the outgoing channel be roasted perfectly and uniformly and that it be devoid of any impurity such as the said husks. The coffee is then cooled with heavily humidifed air but the said cooling requires a limited amount of time since the ambient temperature at which the coffee is moved inside the machine in question is, as has been stated several times, gradually decreasing and, therefore, the coffee has to be cooled not by the drying temperature but by a temperature much below this.

In order that it be possible to roast perfectly any type of coffee and other similar product, provision has been made for the diaphragms 10 and 11. These enable too brusque a, and therefore an undesired expansion (with a consequent drop in the temperature) of the hot air arriving from the manifold 30 in the lower area 9a of the internal chamber, to be avoided. Furthermore, the said diaphragms 10 and 11 prevent the hot air from only moving upwards, and thus by regulating the position thereof along the support and regulation element 13, and the dimension of the holes 12 in the diaphragms, it is possible to obtain three different temperatures in the three separate areas 9a, 9b and 9c of the internal chamber that comply with the differing heat requirements of the coffee during the forward movement of this inside the lower spiral 23.

The beans require and are able to accept, in fact, a greater quantity of heat in the area close to the infeed channel 27 where they contain the highest percentage of humidity, while they need less heat in proximity of the outgoing channel 29 where they are practically already roasted. A further regulation possibility lies in varying the temperature of the hot air injected through the manifold 30 and in varying the vibration speed of the vibrator 7.

In practice, it has been seen that with a machine according to the invention for the continuous roasting of products such as coffee and barley, every one of the foregoing objects is attained and, in particular, that: roasting takes less time; the exchange air temperature is lower; and that the roasting is better and more uniform, with less losses in weight and a large increase in the volume of the product roasted.

The description of the machine in question, based on the accompanying drawings, has obviously been given purely as an unlimited example. It is, therefore, clear that without deviating from the framework of protection afforded to the claims listed hereunder, any modification and improvement emerging from practical experience and the operation of the machine may be made thereto.

For example, both of the sheet metal strips 21 and 22 may be drilled or be of a reticular structure for the purpose of fostering even more the passage of air in between the beans being roasted.

What is claimed is:

1. A machine for the continuous roasting of products such as coffee comprising:
    a cylindrical casing that is closed at the top by a hood with a vent, said casing being connected to a vibrating base,
    a channel shaped in the form of a cylindrical spiral about a vertical axis resting on the bottom of said cylndrical casing, said channel being disposed between an internal cylindrical liner and an external cylindrical liner, said internal cylindrical liner defining an internal chamber within said machine, said external cylindrical liner being closed at its top by a cover, said cover being within said closed cylindrical casing, said channel having an inner surface, an outer surface, and a transport surface, said transport surface being adapted to transport said products upwardly through said spiral-shaped channel when said casing is vibrated,
    a hopper in communication with said channel through an infeed duct connected to said channel at its base,
    means in communication with said channel for discharging said products from said machine as said products reach the top of said spiral-shaped channel,
    means for blowing heated air into said internal chamber at its bottom, and
    at least one vertically adjustably mounted diaphragm in said internal chamber, said diaphragm having adjustably sized holes therein for restricting flow of heated air upwardly through said chamber,
    said outer and transport surfaces, but not said inner surface, of said channel being permeable and in communication with said internal chamber so as to permit said heated air to flow past said products in said channel and outward from said machine through said vent.

2. The machine of claim 1, wherein there are two of said vertically adjustably mounted diaphragms.

3. The machine of claim 1, further comprising a strip also shaped in the form of a cylindrical spiral about said vertical axis, said strip being adjustably permeable to the flow of heated air therethrough, and mounted in said channel parallel and in spaced relationship to said channel transport surface.

* * * * *